L. L. BROWN AND H. J. DEUTSCHBEIN.
CAISSON.
APPLICATION FILED NOV. 9, 1916.
1,369,217.
Patented Feb. 22, 1921.
5 SHEETS—SHEET 1.
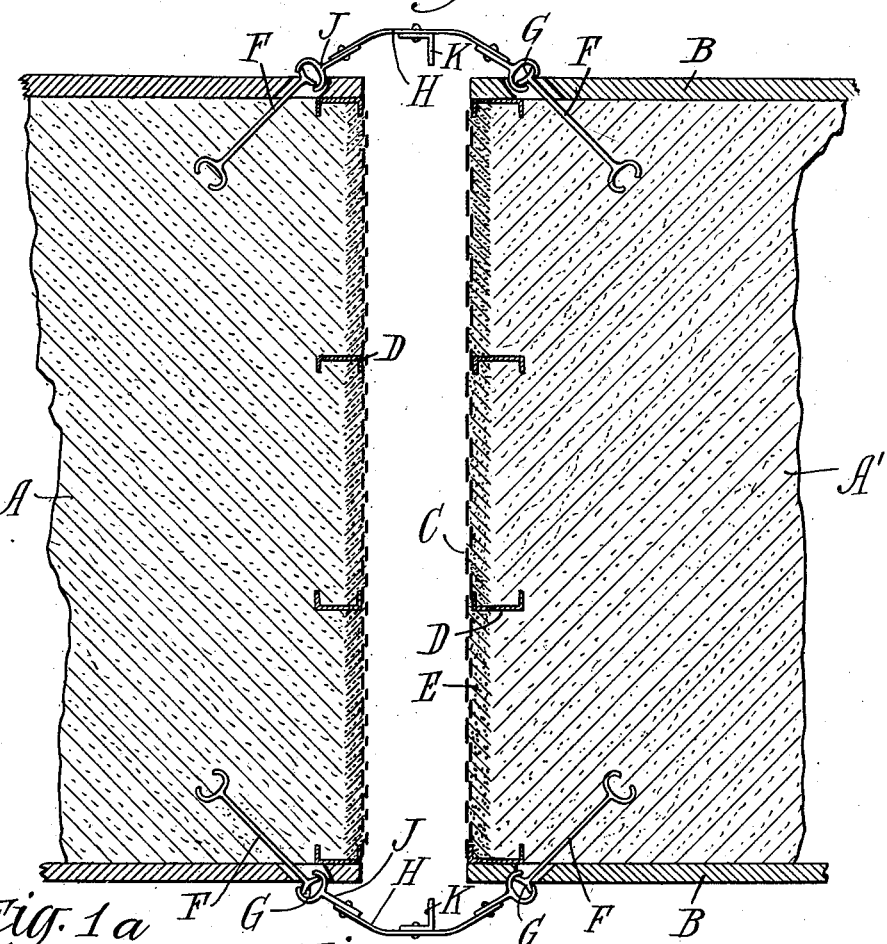
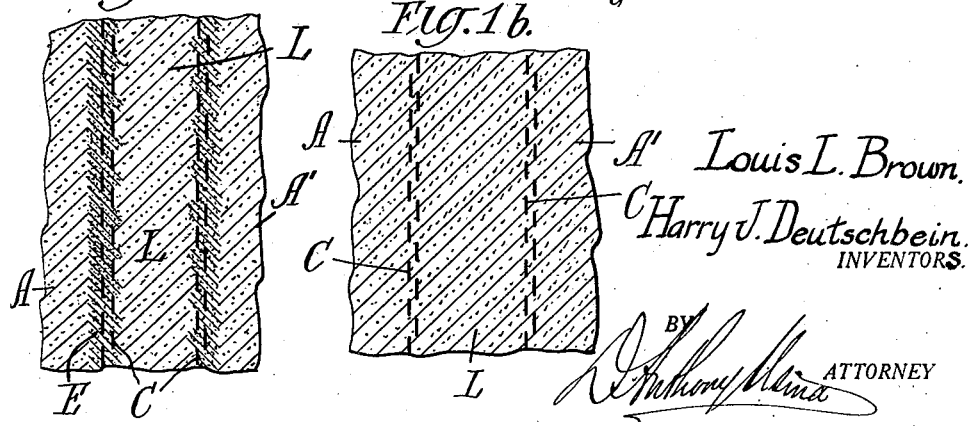
Louis L. Brown.
Harry J. Deutschbein.
INVENTORS.
BY
ATTORNEY

L. L. BROWN AND H. J. DEUTSCHBEIN.
CAISSON.
APPLICATION FILED NOV. 9, 1916.

1,369,217.

Patented Feb. 22, 1921.
5 SHEETS—SHEET 2.

INVENTORS
Louis L. Brown.
Harry J. Deutschbein.
BY
Anthony Alaina, ATTORNEY

L. L. BROWN AND H. J. DEUTSCHBEIN.
CAISSON.
APPLICATION FILED NOV. 9, 1916.
1,369,217.
Patented Feb. 22, 1921.
5 SHEETS—SHEET 3.
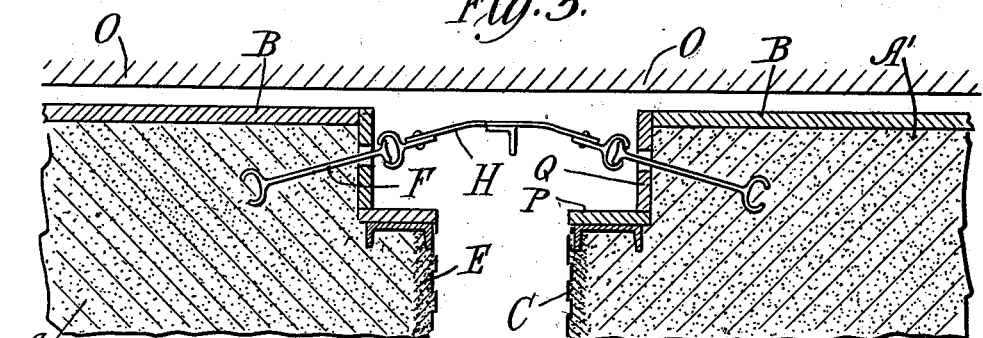
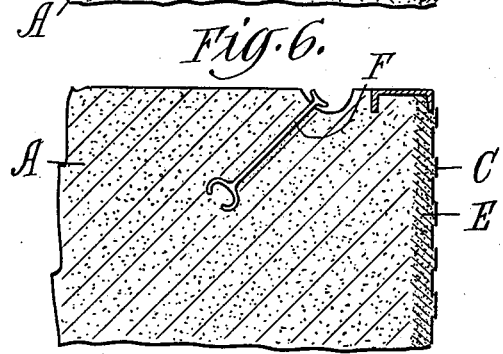
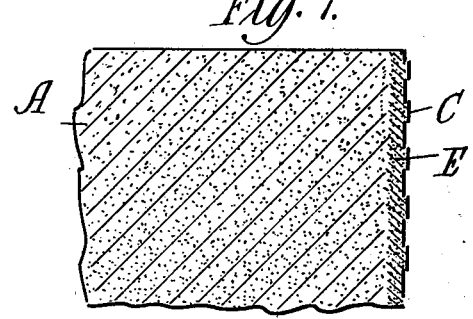
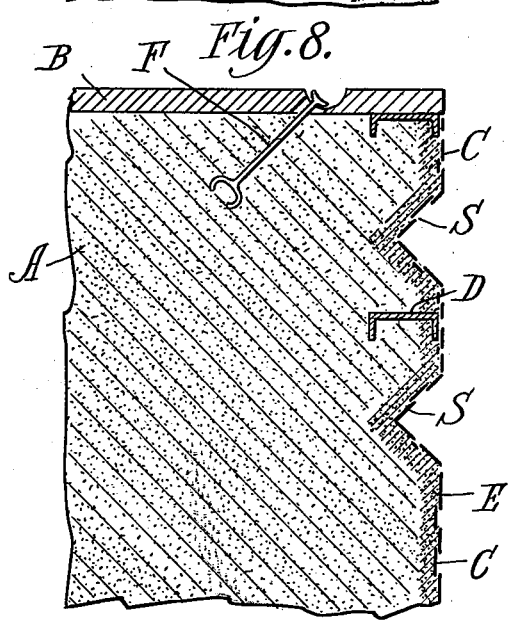
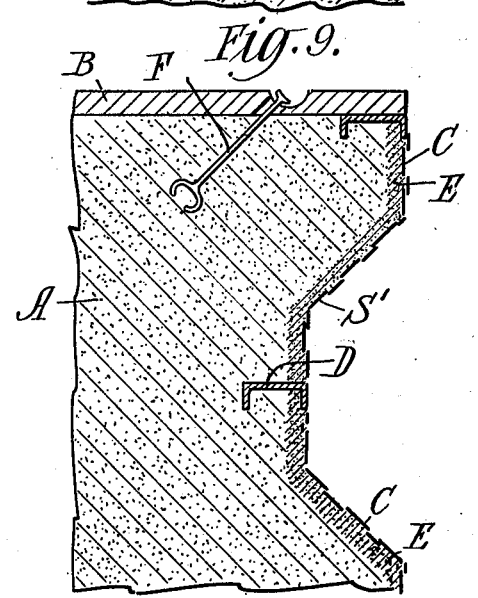
Louis L. Brown, INVENTORS.
Harry J. Deutschbein.
BY
ATTORNEY

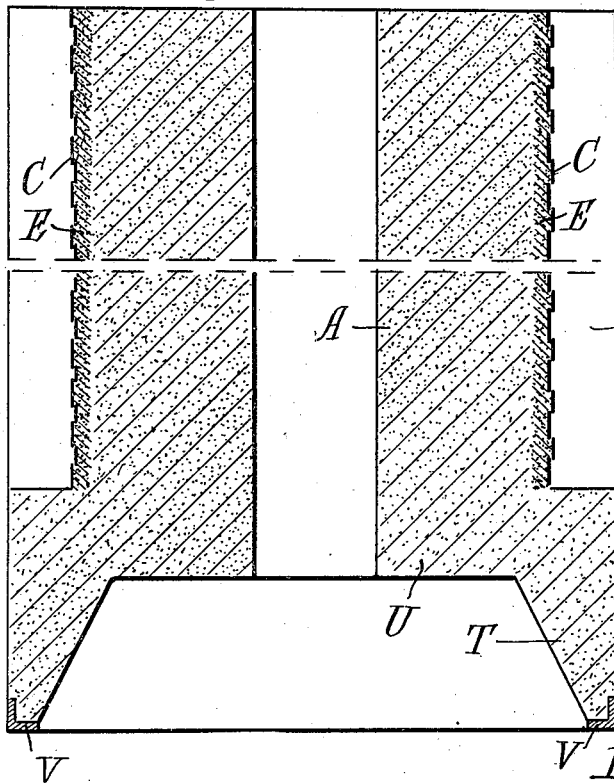

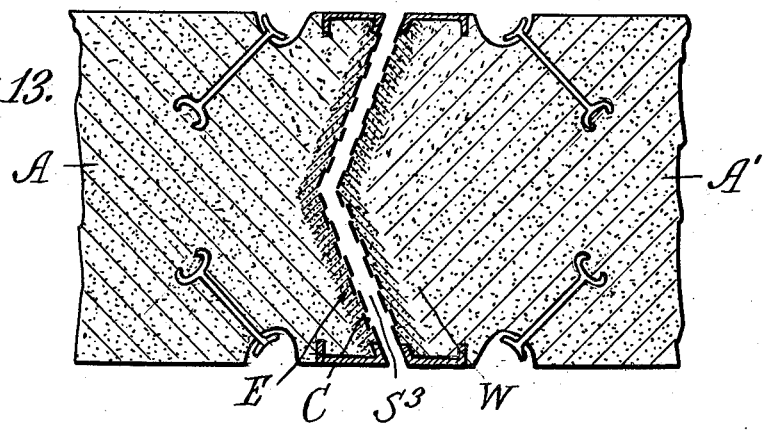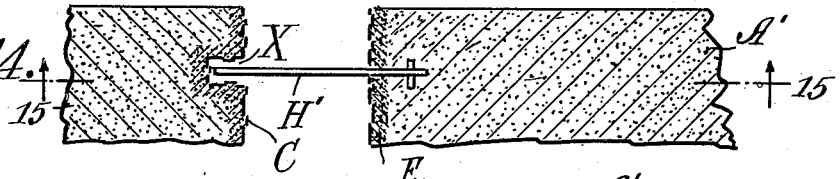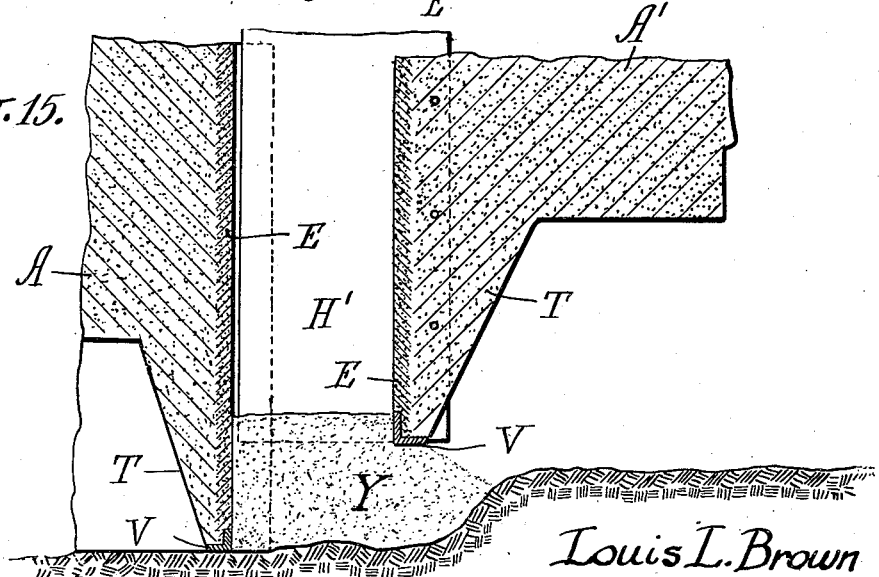

UNITED STATES PATENT OFFICE.

LOUIS L. BROWN, OF NEW YORK, AND HARRY J. DEUTSCHBEIN, OF BROOKLYN, NEW YORK, ASSIGNORS TO THE FOUNDATION COMPANY, A CORPORATION OF NEW YORK.

CAISSON.

1,369,217.

Specification of Letters Patent.  Patented Feb. 22, 1921.

Application filed November 9, 1916. Serial No. 130,398.

*To all whom it may concern:*

Be it known that we, LOUIS L. BROWN and HARRY J. DEUTSCHBEIN, citizens of the United States, residing in the city, county, and State of New York and the borough of Brooklyn, county of Kings, and State of New York, respectively, have invented certain new and useful Improvements in Caissons, of which the following is a specification.

Our invention aims to provide certain improvements in caissons and in the joining thereof. In making caisson foundations for buildings it is often desired to provide a continuous wall around the excavation to the depth of the cellar and any sub-cellars. Also in other constructions it is desired to make a long wall by the sinking of caissons. The controlling of the descent of the caissons cannot be accomplished with great accuracy. It is impossible to sink one close up against another. Various expedients have been proposed and used for joining such caissons. Our invention provides a simple, cheap and safe method of doing this and provides other advantages referred to in detail hereinafter.

Figure 1 is a horizontal section of the adjacent ends of a pair of caissons sunk in place ready for the excavation of the earth between them;

Fig. 1ª is a partial section of the same showing a filling of concrete making a joint between the two caissons;

Fig. 1ᵇ is a similar section illustrating a modified method;

Figure 2:
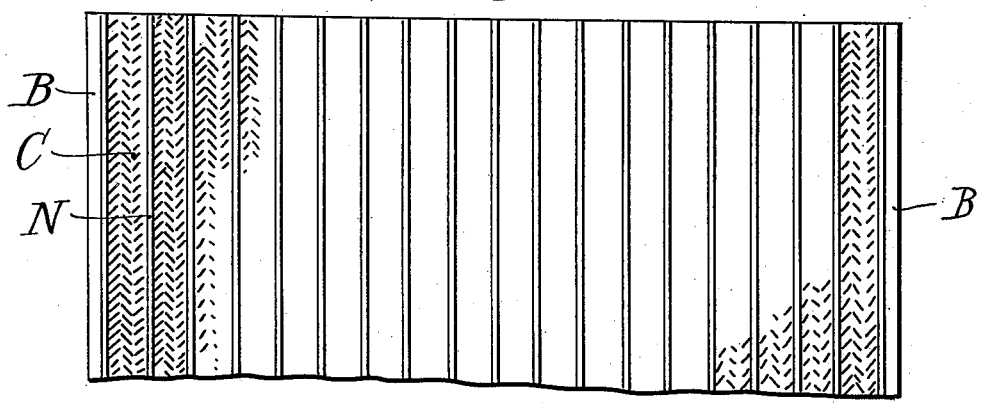
Fig. 2 is an elevation of an end face of one of the caissons of Fig. 1.
Figure 3:
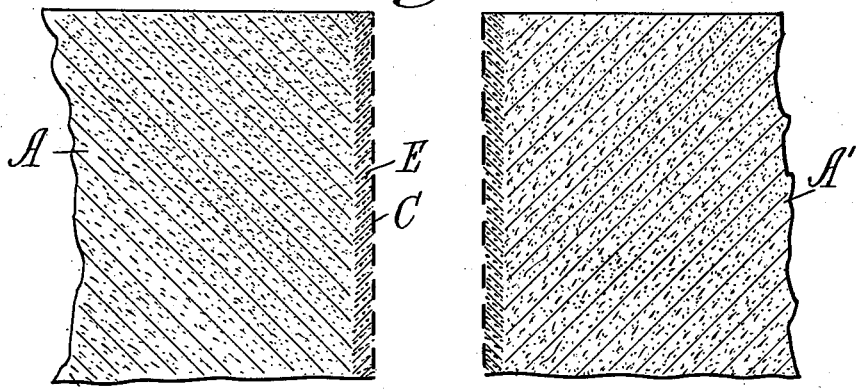
Fig. 3 is a longitudinal vertical section through the same caissons.
Figure 4:
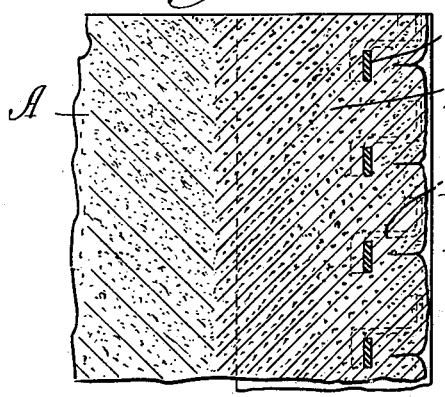
Fig. 4 is an enlarged detail of Fig. 3.
Figure 4A:
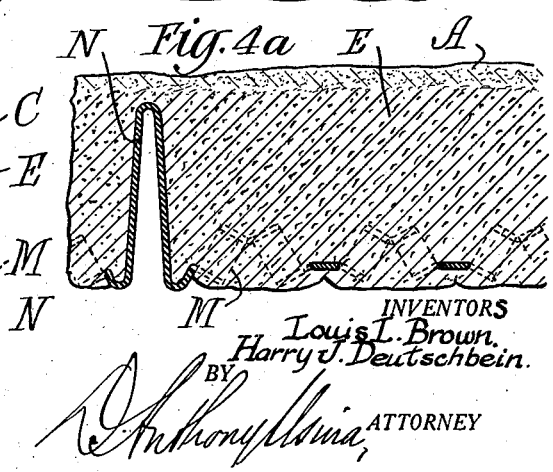

Fig. 4ª is a horizontal section of the same;

Fig. 5 is a partial view similar to Fig. 1, showing a modified style of end closure of the space between the caissons;

Figs. 6, 7, 8, 9 and 10 are horizontal sections of alternative designs;

Figs. 11 and 12 are longitudinal vertical sections of alternative designs;

Fig. 13 is a horizontal section of still another design;

Figs. 14 and 15 are respectively a horizontal section and a vertical longitudinal section (on the line 15—15 of Fig. 14) of an alternative style of closure of the joint space.

The common type of caisson consists of a shell of steel or timber with a deck or roof about six feet above its lower or cutting edge, the space below being the working chamber and the shell above the roof constituting a permanent cofferdam to hold back the earth. Such caissons are sunk and then filled with concrete to form the finished pier. Various schemes have been proposed for securing a concrete-to-concrete joint between two adjacent caissons, by withdrawing a portion of the original timber or steel caissons after the sinking of them, exposing concrete within, and then excavating and introducing the joint concrete between the two caissons. One of the features of advantage of our invention is that the joint is made without the removal of any part of the caissons. At the same time a concrete-to-concrete joint may be secured by reason of the construction of the caissons. That is, the cassions are built with a body of concrete which is more or less exposed on its joint face. When such caissons are sunk and the space between them excavated and a filling of concrete inserted the latter engages directly the exposed concrete faces of the caissons and makes a strongly cemented joint. The joint or key between the two caissons may extend down to the cutting edge or only to the level of the roof of the working chamber or to any desired depth less than that of the roof.

Referring now to the embodiment of the invention illustrated, Fig. 1 shows the adjacent ends of the concrete bodies A, A' of two caissons which are sunk as near to each other as is practicable, say eight to twelve inches apart. In this case the concrete bodies are formed above the roof of the working chamber before the caissons are sunk, leaving only a vertical shaft or shafts for access to the working chamber. Timber (or they may be metal) sides B are provided as forms to hold the concrete until it sets. They may be afterward sunk with the caissons where it is cheaper to do this than to remove them, or they may be removed. For the ends of the shell in which the concrete body is to be cast we use metal with apertures therethrough so that the concrete may extend to and form a greater or smaller portion of the exposed end faces of the caissons. In the example illustrated we use for this purpose sheets of perforated sheet metal C such as are commonly used as permanent centers for cement partitions in buildings and similar uses, being generally stiffened by vertical corrugations and punched out at intervals. In building a caisson we set up the sides B and ends C, using special vertical stiffeners D for the latter, if necessary, and then apply a thick layer of plastic material such as cement mortar or fine concrete or the like as indicated at E upon the inner face of the metal sheet C. This plaster is thick enough to hold its shape and to extend through the apertures in the sheet metal so as to form keys which bind it thereto and which are exposed on the outer face of the metal somewhat as ordinary plastering is held by lathing.

We then have a shell consisting of the solid timber or metal sides B and the plastered metal ends C. This shell is filled with the more fluid concrete which is generally used for the bodies of caissons. When the latter has set and hardened sufficiently the caissons are sunk.

The ends of the space between the caissons are then closed. We have designed a special means for doing this most effectively. Embedded in the concrete bodies of the caissons, or otherwise fastened thereto, are anchors F consisting of suitable lengths of steel bars of a style commonly used for sheet piling and having heads G which serve as guides for the end closures. Each end closure consists of a strip H of flexible metal carrying grooved end pieces J adapted to fit over the heads G of the anchors, the strips H being preferably stiffened by vertical angles K riveted on their inner faces. After the caissons are sunk the strips H are brought into engagement with the guiding heads G and are driven by a hammer to the depth required. This closure has considerable flexibility to adapt it to this class of work. The caissons are ordinarily very large and in sinking them it is impossible to follow exactly for a given distance a straight line. Consequently the two guiding heads G of the opposite caissons may be very far from parallel with each other or they may be separated a greater or less distance from that intended or one may be shifted out of line forward and the other out of line backward; or all of these errors may occur in greater or less degree. The strip H is bowed in horizontal section to allow horizontal extension and contraction and is sufficiently flexible to permit it to assume the warped position necessary as its grooved ends follow down the opposite guides G, the only substantial stiffness being in the vertical central portion where the stiffener K is located to permit it to be driven without being substantially bent except as is necessary to keep its engagement with the opposite caissons.

When the opposite end closures H have been driven the space between can be readily excavated in any usual or suitable way, leaving exposed the sheet metal end pieces C with concrete covering a greater or less portion of their exposed outer faces, such concrete being integral with the inner layer of plaster E which is cemented to the body of concrete within so as to be practically unitary therewith. The space between is then filled with a body of concrete L (Fig. 1ª) which unites directly with the concrete exposed on the face of the caissons and thus makes a practically continuous wall of concrete including the concrete bodies of the caissons and the concrete filling between them. Instead of concrete any equivalent plastic material may be used. Even good clay has been found in some cases to make a substantially tight joint, but hydraulic cementt concrete is to be preferred generally.

Instead of introducing the body of concrete before sinking, the shell consisting of the sides B and the plastered ends may be sunk as an open cofferdam above the working chamber and subsequently filled with concrete. In this case the sides B would have to be more substantial and more strongly braced to resist the inward pressure of the surrounding earth since there would be no concrete within to support them against such pressure.

The use of perforated or apertured metal for the ends, and even for the sides, has certain advangtages also with other methods of sinking. For example, by the aid of temporary forms the perforated metal can be used without previous plastering. The shell being set up of sides and perforated metal ends a temporary form of boards may be placed outside the metal ends and the interior filling of concrete introduced and allowed to harden, thereafter withdrawing the temporary end forms, sinking the caissons and excavating and filling the intervening space with concrete as before. The cross-section of the joint would then appear as in Fig. 1ᵇ with the concrete bodies A and A' and intermediate filling L of substantially the same concrete passing through the openings in the perforated metal sheets E which reinforce and unite the caissons more strongly to each other.

Or the same result might be achieved by making a shell as before with a well braced timber (or steel) end piece outside of the perforated metal, and designed in known ways so as to permit its subsequent withdrawal, sinking the caissons, closing the ends of the intervening space and excavating the same, and then withdrawing the timber or steel end pieces or substantial portions thereof and filling the caissons and intervening space with concrete.

In fact the apertured metal construction has considerable value even where the caissons are not to be joined to each other. It may be used for one or more of the ends or sides of a caisson built and sunk in any one of the foregoing ways with a concrete body. In such uses it is economical and serves to stiffen the caisson and to reinforce the concrete near the outer faces thereof.

The rough face of the metal aids in providing an interlocking contact between the caissons and the joint concrete between them and in some cases this will be a sufficient connection so that the sheets of metal need only be roughened on their outer faces, without perforations through them. While this would not give a concrete-to-concrete joint yet it would have the advantage of saving the plastering operation which is preferably used in connection with perforated metal.

Figs. 4 and 4ª illustrate diagrammatically on a larger scale the effect of the plastering operation above described. The sheet C of metal is formed with apertures M of any suitable size and arrangement and the plastering coat E passes through such apertures to form an outer face of practically continuous concrete except in the lines of the imperforate raised stiffening ribs N of the metal sheet. The same, or practically the same, result can be achieved with reticulated metal lathing, ordinary expanded metal lathing and a great variety of such materials which are well known.

Fig. 5 shows a variation of the structures where the caissons are to be sunk close to a wall O of an adjacent building or the like so that there is not room for the end closure H to project as in Fig. 1. In this case the corners of the caissons are rabbeted, either extending the timber sides by additional strips P and Q to form the desired angle, or similarly shaping the perforated sheet metal C. The anchors F in this case have their guiding edges located within the rabbet so that there is room for the flexible strip H to be driven.

Fig. 6 illustrates a caisson with a concrete face which has hardened and from which the side forms have been removed before sinking, the construction being otherwise as in Fig. 1. Fig. 7 shows a caisson of concrete with one of its faces formed with perforated sheet metal as before, the concrete being hardened and the side forms being removed, omitting the anchor for the end closure: illustrating the use of the sheet metal for an ordinary separate caisson.

The perforated sheet metal lathing of usual designs has small corrugations which aid the interlocking effect in making a joint. We may, however, use metal without corrugations. Or we may take such plain or such corrugated metal and shape it to provide comparatively large corrugations or vertical grooves in the end faces of the caisson as indicated for example in Figs. 8, 9 and 10. In Fig. 8 the caisson is the same as in Fig. 1 except that the end sheet C is bent to form a pair of vertical grooves S near one of its edges into which the joint concrete will enter to make a firmer interlock; similar grooves being repeated near the opposite edge or at any desired intervals in the width of the face. Or, as in Fig. 9, a large hexagonal groove S' may be formed in the center of the width of the end faces. Or, as in Fig. 10, a broad shallow groove S². In any one of these three cases the side forms B may be arranged as shown in Figs. 8 and 9, to be sunk with the caisson, or may be removed after the concrete has hardened and before sinking, as indicated in Fig. 10.

The depth to which the apertured metal ends or sides of the caissons extend will depend upon the conditions of the work. In Figs. 11 and 12 are shown two special instances. In Fig. 11 the caisson has a body A and a working chamber with sides T and roof U constituted integrally with the body, the cutting edge V being formed of steel angles. The perforated sheets C extend from the top of the caisson down to approximately the top of the roof. A joint between two such caissons would extend therefore to the same depth and this would be sufficient for most cases since it is seldom that the cellar excavation of a building goes lower. For additional security the space between the plain concrete ends of the working chambers might also be excavated and filled with concrete. Or, as in Fig. 12 the perforated sheet metal C may extend clear down to the cutting edge V, the latter being shaped the same in plan as the sheet metal; in which case we would secure all the advantages of our interlocking joint from top to bottom of the caissons.

It has been assumed in connection with the structures above described that the adjacent ends of the caissons would be similarly grooved so that the joint concrete would enter grooves symmetrically placed at opposite sides. The ends of the caissons may be shaped, however, as in Fig. 13, the caisson A being formed with a wide groove S³ and the caisson A' with a similar tongue W adapted to enter the same as far as the conditions of sinking would permit, and thus to aid in interlocking the two caissons against sidewise thrust or movement of one relatively to the other.

This mode of construction facilitates the shaping of the ends of the caissons, and this fact may be utilized to simplify the closing of the ends of the joint space by methods of the sort shown in Figs. 14 and 15. In this case the caisson A is shaped with a groove X into which enters with some play a flexible strip H' anchored in the caisson A'. The caisson A is sunk first. The caisson A' is formed adjacent thereto with the strip H' extending throughout the height of the caisson. As the latter is sunk the workmen therein can excavate a short distance outside of the cutting edge and for a sufficient space to clear a way for the closing strip H', subsequently filling the excavated space with loose sand Y which will hold the air without substantially retarding the descent of the caisson and that of the closing strip H'.

The invention is particularly useful in connection with caissons sunk with the aid of compressed air. It is, however, advantageous in caissons and cofferdams of various other sorts than those specifically referred to and built and sunk by other methods. In fact, though we have described with great particularity of detail certain embodiments of our invention yet it is not to be understood that the invention is restricted to the specific examples illustrated and described. Various modifications may be made by those skilled in the art without departing from the invention.

What we claim is—

1. In the sinking and joining of caissons or piers the method which consists in providing such caissons with vertical guides, driving flexible strips across the space between the caissons and in engagement with said guides to close such space to a desired depth, excavating the space between such closures and filling the same with concrete.

2. The combination with a pair of caissons having adjacent end faces with vertical guides thereon of a flexible strip adapted to engage said guides at its edges and to be driven in engagement therewith.

3. The combination with a pair of caissons having adjacent end faces with vertical guides thereon of a flexible strip adapted to engage said guides at its edges and to be driven in engagement therewith, said flexible strip having a stiffened vertical central portion to facilitate driving the same.

In witness whereof we have hereunto signed our names.

LOUIS L. BROWN.
HARRY J. DEUTSCHBEIN.